Aug. 30, 1960    C. M. TOWNE    2,950,746
CLUTCHED HANDLE FOR TOOL SHANKS
Filed Aug. 12, 1957    2 Sheets-Sheet 1

Inventor:
Claude M. Towne
By: Schroeder, Hofgren,
Brady & Wegner
Attorneys

Aug. 30, 1960 C. M. TOWNE 2,950,746
CLUTCHED HANDLE FOR TOOL SHANKS
Filed Aug. 12, 1957 2 Sheets-Sheet 2

Inventor:
Claude M. Towne
By: Schroeder, Hofgren,
Brady & Wegner
Attorneys

United States Patent Office 2,950,746
Patented Aug. 30, 1960

2,950,746

CLUTCHED HANDLE FOR TOOL SHANKS

Claude M. Towne, Watertown, Wis., assignor to General Metals Corporation, a corporation of Delaware Filed Aug. 12, 1957, Ser. No. 677,734

1 Claim. (Cl. 145—77)

This invention relates to a handle for manipulating tools and more particularly to a handle for imparting selected unidirection rotation to a tool upon oscillation of the handle.

In general, the handle of this invention is properly shaped to be grasped in the palm of a person's hand and has openings therein to receive the shank of a tool selectively inserted in one or another of the openings. The tool shanks, when so inserted through the handle openings, are connected to a drive unit within the handle by which the shank may be driven by turning or oscillating the handle about the tool shank axis. Clockwise or counterclockwise rotation of a tool may be accomplished by selective connection of the tool shank with the drive units within the handle.

The general object of this invention is to provide a new and improved handle of the character described for manipulating tools.

Another object is to provide a handle having drive units therein, one being arranged centrally so as to extend across the handle and others being arranged generally normal thereto for providing selectively different handle forms relative to tool shanks with which it may be used.

Another object is to provide a handle for tools which is formed of an assembly of parts having spaces or cavities therein so related that they may hold drive units in proper position when the handle parts are assembled.

A further object is to provide a compact handle unit of parts removably secured together and in which fastening means both secure the handle parts together and render drive units in the handle operative.

Figure 2:
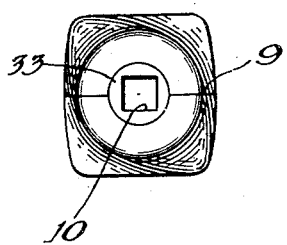
Figure 1:
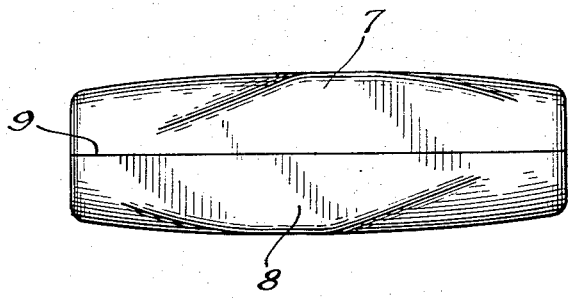
Figure 3:
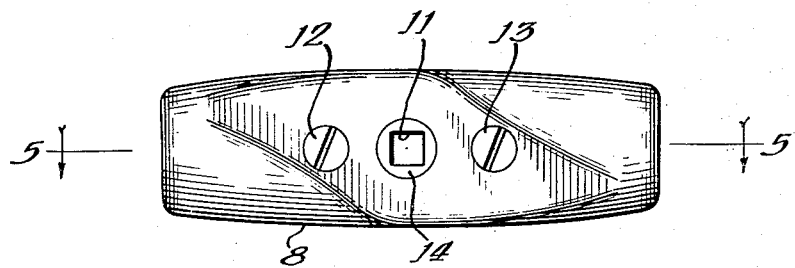
Figure 4:
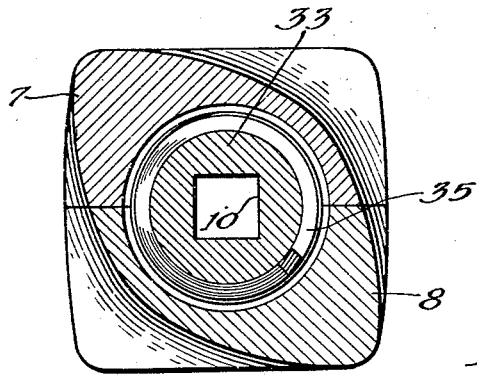
Figure 5:
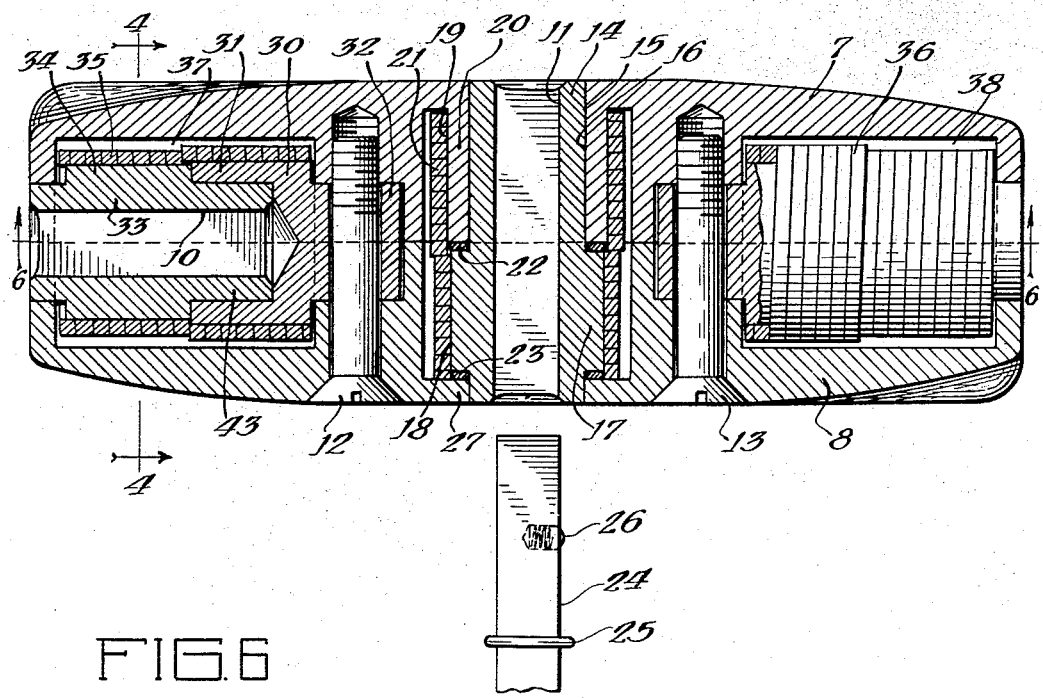
Figure 6:
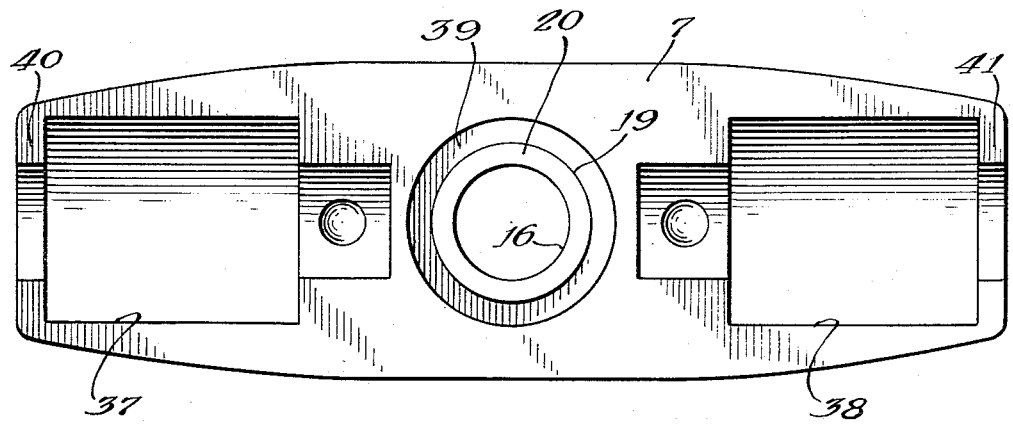

Other objects, features and advantages of the invention will be apparent from the following description of a preferred embodiment illustrated in the accompanying drawings, in which;

Figure 1 is a side elevational view of a manipulating handle embodying the invention, Figure 2 is an end view of the handle of Figure 1, Figure 3 is a bottom plan view of the handle illustrated in Figure 1, Figure 4 is a cross-sectional view through the handle taken substantially along line 4—4 in Figure 5, Figure 5 is a medial sectional view through the handle taken substantially along line 5—5 in Figure 3 and showing a tool shank fragmentarily in position to be inserted therein, and Figure 6 is a plan view of the upper section of the handle with the drive units removed, taken generally along line 6—6 in Figure 5.

The handle structure of this invention is intended to be grasped in the hand with the hand clenched about the handle. In Figure 1, the handle is shown as having an upper portion 7 and a lower portion 8 joined along a parting line 9 generally at a longitudinally extending center plane of the handle. In Figure 2, it will be noted that the handle parts are contoured cooperatively such that the central portion of the handle is generally square with rounded corners which become more rounded toward each end so that the shape at the ends is more like an ellipse. The shape is intended to fit the contours of the hand in grasping the handle. In Figure 2, a square opening 10 is visible in the end of the handle for receiving the tool shank. A similar square opening 11 is visible in Figure 3 and extends generally through the handle in the central portion thereof. Fastening machine screws 12 and 13 are also visible to each side of the square opening 11 and serve the purpose of holding the handle parts 7 and 8 together.

The handle may be formed of various materials and given surface treatment of various kinds to enhance the appearance and saleability of the handle. The structure shown is made of die cast aluminum alloy and as such requires no machining in order to prepare the castings for assembly.

The handle is provided internally with driving units which are intended to receive tool shanks inserted therein. In Figure 2 the square bore 10 may receive a shank generally aligned with the longitudinal extent of the handle. A similar opening is provided in the opposite end of the handle. These openings are in driving units which will rotate the shank in a single direction upon oscillation of the handle about its length. The central opening 11 extends clear through the handle so that a tool shank may be placed in either end of the opening 11. This opening is also in a part of a driving unit which may be rotated in one direction upon oscillation of the handle. The several driving units within the handle permit clockwise or counterclockwise movement of a tool shank as desired by selecting which of the driving units is to be used with the particular tool. Various sundry tools may be used with this handle. Among some of the tools most readily available for use with the handle are augers, wood bits, wrenches, screwdriver bits and other tools having shanks. If the shank of any of these tools is placed in the central drive unit, the handle forms a T-shape with the tool shank. When the tool shank is placed in one of the end driving units, the handle assumes a position more like that of an ordinary screwdriver handle with relation to the tool shank.

The construction of the driving units is best illustrated in Figure 5. The central square bore 11 is broached into the central part of a driving sleeve 14 which has bearing support by its surface 15 directly against a bore 16 in the upper handle part 7. The sleeve has an enlarged part 17 having an outer cylindrical surface 18 about .023″ smaller than the cylindrical surface 19 of the skirt 20 formed integrally with the handle part 7. The enlarged cylindrical part of the driving sleeve and the skirt 20 are surrounded by a helically wound, square wire, spring clutch member 21. The spring permits driving of the drive sleeve with the handle in one direction and allows the handle to slip relative to the sleeve when turned in the opposite direction about the axis of the sleeve. The spring found quite satisfactory has an internal diameter when at rest, about .007″ smaller than the cylindrical surface 19. This difference in size is sufficient to maintain the spring properly in the assembly and permit the requisite clutching action. The form of the skirt 20 is best seen in Figure 6 showing the upper part 7 of the handle without the driving units therein. Phenolic resin thrust washers 22 and 23 have direct bearing between the enlarged portion of the driving sleeve and the adjacent portions of the handle in order to absorb any thrust on the sleeve. A tool shank 24 having a stop shoulder 25 and a spring pressed ball detent 26 is shown in position to enter the square bore 11 of the driving sleeve. Any thrust to be transmitted between the handle and the shank will be taken up by the thrust washers preventing any damage to the die cast aluminum parts.

It should be noted that the central drive unit driving sleeve is assembled into the handle member by a mere placement of the handle parts 7 and 8 into mating relation. The part 8 has a reduced section 27 against which the thrust washer 23 abuts to hold the driving sleeve against the end of the skirt 20. The sleeve has some play crosswise of the handle but only sufficient to insure turning of the sleeve within the handle free of any frictional binding.

The end driving units are arranged substantially normal to the central unit. Each of the units has a part, stationary relative to the handle, held in that position by one of the fastening members. Referring to Figure 5, the stationary part 30 has a cylindrical hollow skirt portion 31 integrally formed with an apertured cylindrical base 32 which is impaled upon the machine screw 12. This member is held stationary relative to the handle by the machine screw which is threaded into the handle part 7 and has its head countersunk in handle part 8 so as to be flush with the outer handle surface. The drive sleeve 33 has a square bore 10 as is visible in Figure 2 and is also equipped with an enlarged portion 34 so that a helically wound, square wire spring 35 may extend about both the cylindrical part 31 and the enlargement of the drive sleeve. The size variations of the cylindrical enlargement, stationary part and spring are generally the same as described for the central drive unit. The driving sleeve has an extension 43, cylindrical in form and providing a bearing support for the sleeve within the hollow stationary member 30. Thrust is taken up between the drive sleeve and its stationary cooperating part.

Each of the end driving units is similarly formed. The drive sleeve on the right hand side of Figure 5 may provide counterclockwise rotation of a tool shank inserted therein and thus has a left hand wound clutch spring 36. The clutch spring 35 on the left hand unit has a right hand winding and thus may produce clockwise rotation of a tool shank inserted therein.

The handle parts are provided with cavities to receive the parts of the driving units so that when assembled, the driving units are held in proper position. In Figure 6, the handle part 7 is provided with semi-cylindrical cavities 37 and 38 for receiving half of the end driving units. The mating part 8 of the handle is similarly formed. The space 39 about the skirt 20 will freely receive the helical spring clutch of the central unit while the handle part 8 has an enlarged bore to receive the enlarged cylindrical part of the central drive sleeve. The end flanges 40 and 41 mate with similar flanges on the handle part 8 to retain the end driving units in place. All the driving units are similar in their operation, the clutch spring providing a practically instantaneous release or driving relation depending upon the direction of handle rotation.

A very effective and versatile tool manipulating handle results from the use of the present invention. A tool shank may be selectively inserted into the central drive sleeve from either end depending upon the desired direction of rotation, and the handle gives a T-shape driving grasp of the tool. In the event that the space available for working will not permit the T-handle operation, the end driving units may be used on a tool shank giving a handle form extending generally in the direction of the shank without appreciable lateral extension. Since the end drive units provide opposite unidirectional rotation of their respective drive sleeves, the operator need only select the proper end of the handle for use with the tool in order to obtain desired drive. In practice, some convenient visible marking of the drive units indicating their drive direction may be employed on the handle parts.

The foregoing detailed description has been given for clearness of understanding only and no unnecessary limitations should be understood therefrom for some modifications will be obvious to those skilled in the art.

I claim:

A manipulating handle for a tool, comprising: a handle body adapted to be grasped for manipulation and having a bore extending therethrough opening to opposite sides of the body, said body having portions separable on a plane transverse said bore, one of said body portions having an annular recess about the bore forming a cylindrical skirt generally concentric with the bore, the other body portion having a bore portion larger than said skirt; a drive sleeve rotatable within the bore in said body portion having the skirt and having an enlarged cylindrical portion extending outwardly in the other body portion, said enlarged portion and skirt having outer surfaces generally in alignment and in tandem, said drive sleeve having a central passage open at both ends on opposite sides of the handle for receiving a tool shank inserted in either end thereof; and a helical clutch spring frictionally embracing the skirt outer surface and enlarged cylindrical portion of the drive sleeve outer surface to clutch the sleeve to the handle upon movement of the handle in direction to wind the spring upon the sleeve, said spring permitting relative motion between the drive sleeve and handle in the opposite direction whereby the handle may drive the sleeve in one direction to obtain selective directional drive of a tool shank when placed in opposite ends of the drive sleeve.

References Cited in the file of this patent

UNITED STATES PATENTS

| | | |
|---|---|---|
| 134,355 | Burch | Dec. 31, 1872 |
| 1,441,930 | Julin | Jan. 9, 1923 |
| 2,570,570 | Lee | Oct. 9, 1951 |
| 2,792,094 | Baldwin | May 14, 1957 |

FOREIGN PATENTS

| | | |
|---|---|---|
| 693,464 | France | Nov. 20, 1930 |